(12) United States Patent
So et al.

(10) Patent No.: US 11,010,635 B2
(45) Date of Patent: May 18, 2021

(54) METHOD FOR PROCESSING ELECTRONIC DATA

(71) Applicant: City University of Hong Kong, Kowloon (HK)

(72) Inventors: Hing Cheung So, Kowloon (HK); Wen-Jun Zeng, Kowloon (HK); Jiayi Chen, Shenzhen (CN); Abdelhak M. Zoubir, Darmstadt (DE)

(73) Assignee: City University of Hong Kong, Kowloon (HK)

( * ) Notice: Subject to any disclaimer, the term of this patent is extended or adjusted under 35 U.S.C. 154(b) by 147 days.

(21) Appl. No.: 16/126,049

(22) Filed: Sep. 10, 2018

(65) Prior Publication Data

US 2020/0082217 A1   Mar. 12, 2020

(51) Int. Cl.
| | |
|---|---|
| *G06K 9/62* | (2006.01) |
| *G06K 9/46* | (2006.01) |
| *G06K 9/40* | (2006.01) |
| *G06F 17/11* | (2006.01) |
| *G06F 17/16* | (2006.01) |

(52) U.S. Cl.
CPC ............ *G06K 9/6247* (2013.01); *G06F 17/11* (2013.01); *G06F 17/16* (2013.01); *G06K 9/40* (2013.01); *G06K 9/4604* (2013.01)

(58) Field of Classification Search
CPC ................... G06F 17/14–148; G06F 17/16–18
See application file for complete search history.

(56) References Cited

U.S. PATENT DOCUMENTS

2016/0055124 A1\* 2/2016 Galvin ................... G06F 17/16
707/741

OTHER PUBLICATIONS

Z. Wang, et al., Rank-One Matrix Pursuit for Matrix Completion, Proceedings of the 31st International Conference on Machine Learning, JMLR: W&CP vol. 32, 2014 (Year: 2014).\*
J. Yan, et al., Sparse 2-D Canonical Analysis via Low Rank Matrix Approximation for Feature Extraction, IEEE Signal Processing Letters, vol. 19, No. 1, 2012 (Year: 2012).\*
A.B. Xu et al., Low-rank approximation pursuit for matrix completion, Mechanical Systems and Signal Processing 95, 2017 (Year: 2017).\*
N.K. Krivulin, Rank-One Approximation of Positive Matrices Based on Methods of Tropical Mathematics, Vestnik St.Petersb. Univ. Math, vol. 51, No. 2, Jun. 2018 (Year: 2018).\*
P. N. Belhumeur, et al, "Eigenfaces vs. Fisherfaces: Recognition Using Class Specific Linear Projection", IEEE Transactions on Pattern Analysis and Machine Intelligence, vol. 19, No. 7, pp. 711-720, Jul. 1997.

(Continued)

*Primary Examiner* — Andrew Caldwell
*Assistant Examiner* — Emily E Larocque
(74) *Attorney, Agent, or Firm* — Renner Kenner Greive Bobak Taylor & Weber

(57) ABSTRACT

A method for processing electronic data includes the steps of transforming the electronic data to a matrix representation including a plurality of matrices; decomposing the matrix representation into a series of matrix approximations; and processing, with an approximation process, the plurality of matrices thereby obtaining a low-rank approximation of the plurality of matrices.

10 Claims, 8 Drawing Sheets

(56) References Cited

OTHER PUBLICATIONS

J. Yang, et al, "Two-Dimensional PCA: A New Approach to Appearance-Based Face Representation and Recognition", IEEE Transactions on Pattern Analysis and Machine Intelligence, vol. 26, No. 1, pp. 131-137, Jan. 2004.
J. Ye, "Generalized Low Rank Approximations of Matrices", Machine Learning, vol. 61, No. 1-3, pp. 167-191, 2005.
E. J. Candès, et al, "Robust Principal Component Analysis?" Journal of the ACM, vol. 58, No. 3, Article 11, May 2011.

* cited by examiner

METHOD FOR PROCESSING ELECTRONIC DATA

TECHNICAL FIELD

The present invention relates to a method for processing electronic data, and particularly, although not exclusively, to a method for obtaining low-rank representation of signals or data near a low-dimensional subspace and data reconstruction.

BACKGROUND

Electronic data stored in electronic storage medium may be analysed using different processor, including digital processor, which is designed for processing digital source data in the digital domain.

For example, digital images may be processed by a digital signal processor which may efficiently analyse and process the digital image, and the processor may further process the image by further modifying the image data using certain algorithm or digital filter. Alternatively, other types of digital data, such as data related to dimensionality reduction, computer vision, machine learning, pattern classification and data analytics, may also be analysed or processed using digital methods.

SUMMARY OF THE INVENTION

In accordance with a first aspect of the present invention, there is provided a method for processing electronic data, comprising the steps of:
  transforming the electronic data to a matrix representation including a plurality of matrices;
  decomposing the matrix representation into a series of matrix approximations; and
  processing, with an approximation process, the plurality of matrices thereby obtaining a low-rank approximation of the plurality of matrices.

In an embodiment of the first aspect, the approximation process includes a greedy pursuit approximation process.

In an embodiment of the first aspect, the approximation process includes a linear regression process.

In an embodiment of the first aspect, the approximation process includes a $\ell_p$-norm minimization process, wherein $p \in (0,2]$.

In an embodiment of the first aspect, p=1 and the approximation process is a $\ell_1$-GP approximation process.

In an embodiment of the first aspect, the approximation process includes determining a best rank-one approximation of a plurality of residual matrices in each of a plurality of iteration steps in the approximation process.

In an embodiment of the first aspect, the approximation process further includes subtracting a plurality of rank-one basis matrices from the plurality of residual matrices.

In an embodiment of the first aspect, the approximation process further includes a $\ell_p$-rank-one fitting process for obtaining the low-rank approximation of the plurality of matrices.

In an embodiment of the first aspect, the method further comprises the step of representing a solution associated with the matrix representation and the K residual matrices as $(u_i, v_i, s_i)$ and $\{R_k^i\}_{s=1}^K$ at the ith iteration step.

In an embodiment of the first aspect, in the ith iteration step, the rank-one approximation of $\{R_k^{i-1}\}_{k=1}^K$ is determined.

In an embodiment of the first aspect, the method further comprises the step of determining a weighted median in the $\ell_1$-GP approximation process.

In an embodiment of the first aspect, the step of decomposing the matrix representation into a series of matrix approximations includes a non-orthogonal decomposition of the plurality of matrices.

In an embodiment of the first aspect, the non-orthogonal decomposition includes a joint diagonal decomposition.

In an embodiment of the first aspect, the electronic data include at least one of digital image data, textual data, audio data, and financial data.

In an embodiment of the first aspect, the electronic data are digitally compressed.

In an embodiment of the first aspect, the method further comprising the step of constructing a data representation of the electronic data being processed based on the low-rank approximation of the plurality of matrices.

In an embodiment of the first aspect, processing of electronic data includes image reconstruction of digital image with noise and/or defect.

In accordance with a second aspect of the present invention, there is provided a method for processing digital image data, comprising the steps of:
  transforming the digital image data to a matrix representation including a plurality of matrices;
  decomposing the matrix representation into a series of matrix approximations;
  processing, with an approximation process, the plurality of matrices thereby obtaining a low-rank approximation of the plurality of matrices; and
  constructing at least one digital image based on the low-rank approximation of the plurality of matrices.

In an embodiment of the second aspect, the digital image data represents at least one source images with noise and/or defect.

In an embodiment of the second aspect, the approximation process includes a greedy pursuit approximation process.

In an embodiment of the second aspect, the step of decomposing the matrix representation into a series of matrix approximations includes a non-orthogonal decomposition of the plurality of matrices.

In an embodiment of the second aspect, the non-orthogonal decomposition includes a joint diagonal decomposition.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
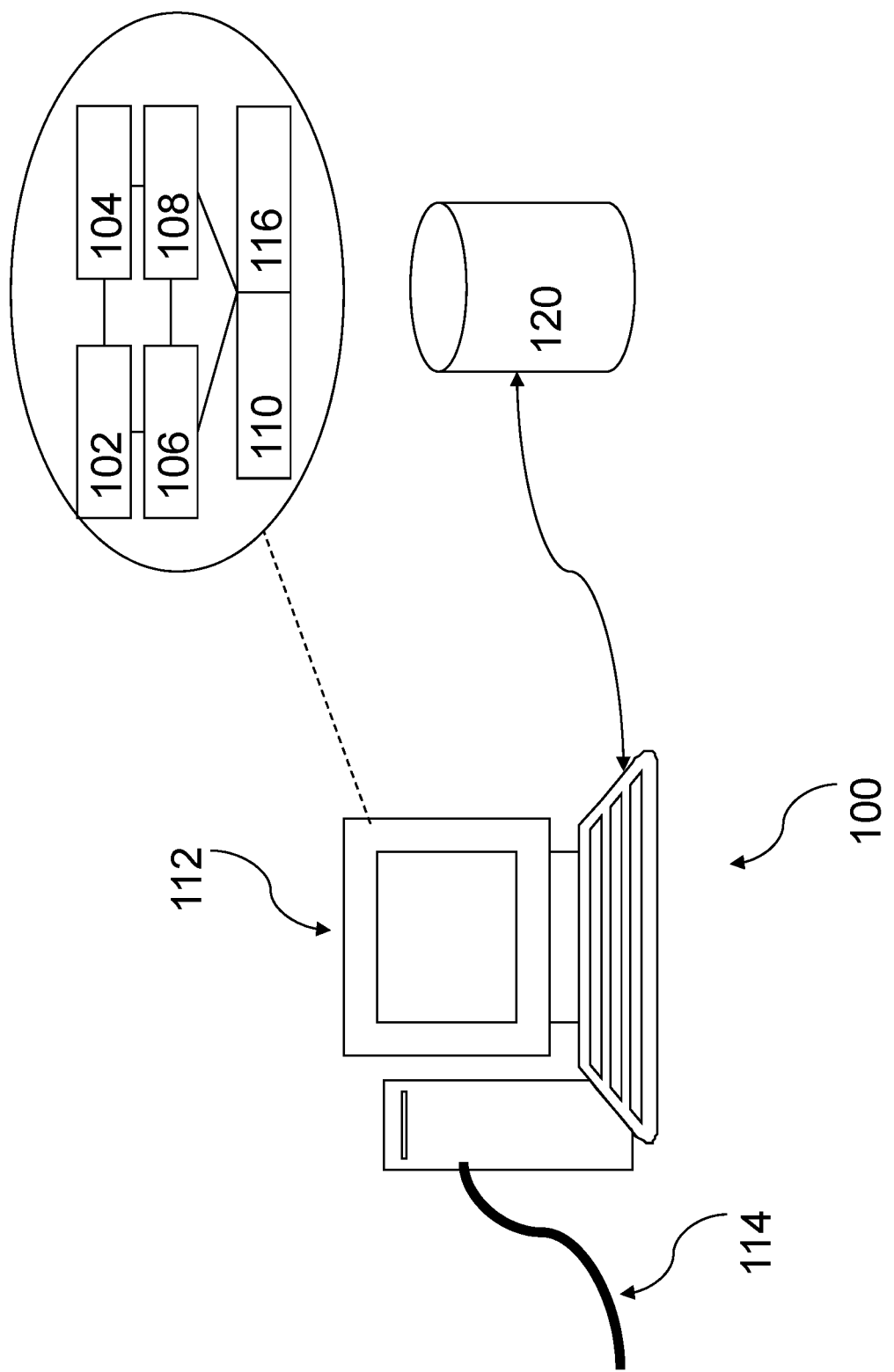
FIG. 1 is a schematic diagram of a computing server for operation as a system for processing electronic data in accordance with one embodiment of the present invention.

The inventors have, through their own research, trials and experiments, devised that, various kind of data, such as electronic data, may be approximated by matrices whose ranks are much smaller than their column and row lengths. The low-rank matrix approximation may extract the low-dimensional subspaces or principal components of the matrices constructed from these signals.

In some example embodiments, low-rank approximation may be applied in computer vision, pattern classification, machine learning, and data analytics. In these examples, signals or data such as textual, visual, audio and financial data lie near some low-dimensional subspace.

For example, principal component analysis (PCA), which may be realized by the truncated singular value decomposition (SVD), may be applied in processing the data. However, it is found that PCA and SVD may only deal with a single matrix and fail to capture the low-rank components when the observations contain outliers.

The inventors noted that PCA may have two limitations. Firstly, it may not work well when the observations contain impulsive noise or outliers. A robust PCA (RPCA) method may be applied instead to model the data matrix as the sum of a low-rank component and a sparse component containing the outliers. This method includes minimizing the nuclear norm of the unknown low-rank matrix plus the $\ell_1$-norm of the outlier component, which can be solved in an iterative manner using the augmented Lagrange method (ALM) to calculate the proximity operators of the nuclear norm and $\ell_1$-norm, which may require expensive computational cost because full SVD is required.

Secondly, PCA/RPCA may be preferably used for processing a single matrix. PCA/RPCA may also handle multiple matrices such as images and video via vectorization to stack all data into one matrix, at the expense of high computational complexity.

Alternatively, to jointly process multiple matrices without vectorization, the two-dimensional PCA (2DPCA) transforms the original matrices into ones with lower column number. However, the 2DPCA merely reduces the column size while the row size remains unchanged because a single-sided transform is adopted, implying limited compression capability.

In another example, a generalized low-rank approximations of matrices (GLRAM) method may apply a double-sided transform to reduce both row and column sizes, which may improve compression capability. Under the same compression ratio, the GLRAM method may achieve smaller reconstruction error than the 2DPCA method. However, these 2D based techniques are not robust to outliers.

Therefore, the inventors have devised a robust low-rank approximation of multiple matrices (RLRAMM) method, which includes an $\ell_p$-greedy pursuit ($\ell_p$-GP) algorithm based on the minimization of the entry-wise $\ell_p$-norm where $0<p<2$.

In one example embodiment, there is provided a robust greedy pursuit (GP) method for joint low-rank approximation of multiple matrices via decomposing the problem into a series of rank-one approximations. Preferably, at each iteration, the best rank-one approximation of the residual matrices is determined via $\ell_p$-norm minimization where $p\in(0,2]$, and then the rank-one basis matrices are subtracted from the residual. A successive minimization method may be used for the $\ell_p$-rank-one fitting. Preferably, only computation of weighted medians is required for the choice of $p=1$, yielding a near-linear complexity with respect to the number and size of the matrices.

With reference to FIG. 1, an embodiment of the present invention is illustrated. This embodiment is arranged to provide a system for processing electronic data, such as but not limited to digital image data, textual data, audio data, and financial data. The system may perform a method for processing electronic data, comprising the steps of: transforming the electronic data to a matrix representation including a plurality of matrices; decomposing the matrix representation into a series of matrix approximations; and processing, with an approximation process, the plurality of matrices thereby obtaining a low-rank approximation of the plurality of matrices.

Preferably, in one example, the system may be used to process digital image data which may be mixed with noise and/or defects (such as missing data from a source image). The raw data of the digital image may be represented, transformed or transcoded as matrix or matrices representing the image data for further processing. The digital data may also be digitally compressed in some examples, and the data may be further compressed or decompressed by the system.

In this embodiment, the system for processing electronic data is implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 1, there is shown a schematic diagram of a computer or a computing server 100 which in this embodiment comprises a server 100 arranged to operate, at least in part if not entirely, the system for processing electronic data with the method in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record 122. The database 120 is in communication with the server 100 with an interface, which is implemented by computer software residing on the server 100. Alternatively, the database 120 may also be implemented as a stand-alone database system in communication with the server 100 via an external computing network, or other types of communication links.

In this embodiment, the system for processing electronic data may perform an approximation process including a greedy pursuit (GP) approximation process.

Preferably, the entire process may start with formulating an initial problem according to the following steps. Given K matrices $\{A_1, \cdots, A_K\} \in \mathbb{R}^{m \times n}$, the task is to find their low-rank approximation. In one example, the following low-rank approximation of $A_k$ may be used:

$$A_k \approx US_k V^T, k=1, \ldots, K \quad (1)$$

where $U=[u_1, \cdots, u_m] \in \mathbb{R}^{m \times r}$, $V=[v_1, \cdots, v_n] \in \mathbb{R}^{n \times r}$, and $S_k = \text{diag}\{s_{k,1}, \cdots, s_{k,r}\} \in \mathbb{R}^{r \times r}$ is a diagonal matrix with r being the target rank. Note that r>min(m,n) is allowed but generally r≤mn is required. Here, U and V are the same for all k but $S_k$ can be different with each other. The columns of U and V span the r-dimensional subspaces of the column and row spaces of $\{A_k\}_{s=1}^{K}$. According to the $\ell_p$-norm minimization criterion, the RLRAMM method in accordance with the present invention may aim to solve the following problem:

$$\min_{U,V,\{S_k\}_{k=1}^K} \sum_{k=1}^{K} \|US_k V^T - A_k\|_p^p, 0 < p \leq 2 \quad (2)$$

where $$\|A\|_p = \left(\sum_{i,j} |A_{ij}|^p\right)^{1/p}. \quad (3)$$

In this example, $\|\cdot\|_p$ denotes the element-wise $\ell_p$-norm of a matrix. The RLRAMM process may find U, V and $\{S_k\}_{k=1}^{K}$ with $\{A_k\}_{k=1}^{k}$ being given.

Data compression may be implemented as an example application of RLRAMM method. In this example, mnK real numbers are required to store the K original matrices but the memory complexity is reduced to (m+n+K)r via low-rank approximation which is only characterized by U, V and the diagonal elements of $\{S_k\}_{k=1}^{K}$, yielding a compression ratio of mnK/((m+n+K)r).

This may imply that (1) can still achieve data compression when r>min(m,n) if r≪mn. Indeed, the compression ratio and reconstruction error decrease as increases. Hence a condition of r>min(m,n) may be employed to attain a satisfying reconstruction error. Note that (2) is nonconvex even for p≥1 due to the product term $US_k V^T$.

Alternatively, for p=2, $\|\cdot\|_p$ becomes the Frobenius norm and it is suitable for noise-free or Gaussian noise case. A benefit of using the Frobenius norm may be the computational convenience. However, this alternatively embodiment may not be robust to outliers. To achieve outlier-robustness, preferably p∈(0,2) is considered (i.e. 0<p<2), and more preferably p=1. For p≤1, (2) becomes more challenging since the $\ell_p$-norm is nonsmooth in this example.

In terms of $u_i$ and $v_i$, (2) is equivalent to $$\min_{\{s_i,u_i,v_i\}} \sum_{k=1}^{K} \left\|\sum_{i=1}^{r} s_{k,i} u_i v_i^T - A_k\right\|_p^p \quad (4)$$

where $$s_i = [s_{1,i}, \cdots, s_{K,i}]^T \in \mathbb{R}^K. \quad (5)$$

In this example, based on the Eckart-Young theorem, the solution of (4) is the truncated SVD of $A_1$ when p=2 and the number of matrices is K=1. That is, $\{s_{1,i}\}_{i=1}^{r}$ are the r largest singular values of $A_1$, and $\{u_i\}_{i=1}^{r}$ and $\{v_i\}_{i=1}^{r}$ are the corresponding left and right singular vectors, respectively. However, when p≠2 or K>1, the truncated SVD cannot be applied to solve (4).

As discussed earlier, PCA may be applied to obtain low-rank representation. However, the PCA cannot directly handle multiple matrices whereas each matrix needs to be converted into a vector $a_k = \text{vec}(A_k) \in \mathbb{R}^{mn}$. Then, the K vectors $\{a_k\}_{k=1}^{K}$ form the columns of the following data matrix:

$$X = [a_1, \cdots, a_K] \in \mathbb{R}^{mn \times K} \quad (6)$$

whose rank satisfies rank(X)≤min(mn,K). The PCA may find a low-rank matrix $\hat{X}$ to best approximate the original data matrix X:

$$\min_{\text{rank}(\hat{X})=r} \|\hat{X} - X\|_F^2 \quad (7)$$

where the target rank r may be taken as r≪min(mn,K) to achieve data compression or dimensionality reduction.

Again, by the Eckart-Young theorem, the solution of (7) may be given by the truncated SVD of X, which may be expressed as:

$$\hat{X} = \sum_{l=1}^{r} \sigma_l(X) t_l y_l^T \quad (8)$$

where $\sigma_l(X)$ is the lth singular value of X while $t_l \in \mathbb{R}^{mn}$ and $y_l \in \mathbb{R}^K$ are the corresponding left and right singular vectors. In data compression, the principal components are stored, that is, the largest r singular values and the corresponding singular vectors $\{\sigma_l(X), t_l, y_l\}_{l=1}^{r}$, resulting in the PCA compression ratio of mnK/((mn+K+1)r).

There may be a number of drawbacks of the PCA method applied to processing multiple matrices. First, it needs to handle a matrix of a much larger size due to transforming the original matrix into a long vector. Indeed, the truncated SVD of X has a high complexity of $\mathcal{O}(\max(m^2n^2,K^2)r)$. For high-dimensional data with mn>K, this complexity becomes $\mathcal{O}(m^2n^2r)$, which quadratically increases with mn. Second, the vectorization breaks the 2D structure and the inherent relation between rows and columns. Third, the Frobenius norm formulation in (7) is not robust to outliers.

The RPCA method may achieve robustness against outliers by modeling X as the sum of a low-rank matrix and a sparse matrix which represents the outliers. It minimizes the nuclear norm of the unknown low-rank matrix plus the $\ell_1$-norm of the outlier component as a regularization term to robustly recover the low-rank component:

$$\min_{L,O} \|L\|_* + \alpha\|O\|_1, \text{ s.t. } L + O = X \quad (9)$$

where $\alpha>0$ is the regularization parameter that needs to estimate in practice. Although (9) is a convex optimization problem and the global minimum is guaranteed, it has a high computational cost even fast algorithms are employed because full SVD of an mn×K matrix is required at each iteration. After separating the outlier component O, the truncated SVD may further be required to the "clean" data matrix L to ensure the rank to be r to achieve data compression. Note that RPCA belongs to the vectorization based methods and thus, it still has the first two drawbacks of the PCA when handling multiple matrices.

The 2DPCA method computes a linear transformation $W \in \mathbb{R}^{n \times r}$ with r<n, such that each matrix is projected to $C_k = A_k W \in \mathbb{R}^{m \times r}$. The W maximizes the variance in the transformed space $$\max_{W^T W = I_r} W^T \left( \sum_{k=1}^{K} (A_k - \overline{A})^T (A_k - \overline{A}) \right) W \quad (10)$$

where $\overline{A} = (\Sigma_{k=1}^K A_k)/K$ is the mean of the matrices. The columns of the optimal W are the r eigenvectors of $\Sigma_{k=1}^K (A_k - \overline{A})^T (A_k - \overline{A})$ corresponding to the largest r eigenvalues. The matrices can be reconstructed by $\hat{A}_k = C_k W^T$. The 2DPCA needs to store $\{C_k\}_{k=1}^K$ and W, implying a compression ratio of (mnK)/((mK+n)r). As the 2DPCA only applies a single-sided transform to the matrices, its compression capability is thus limited. The computational complexity of the 2DPCA is $\mathcal{O}(mn^2K)$.

In another example, the GLRAM method solves the following constrained problem:

$$\min_{U^T U = V^T V = I_r, \{S_k\}} \sum_{k=1}^{K} \|US_k V^T - A_k\|_F^2 \quad (11)$$

where the orthonormal constraints makes it different from the RLRAMM formulation (2) where U and V are not necessarily orthogonal. In addition, the matrices $\{S_k\}_{k=1}^K$ given by the GLRAM are not diagonal whereas those of the RLRAMM are diagonal. Hence, the compression ratio of the GLRAM is mnK/((m+n+Kr)r), which is lower than the method in accordance with embodiments of the present invention for the same r.

In yet another example embodiment, by exploiting the orthogonality of U and V, the GLRAM method may be reduced to $$\min_{U^T U = V^T V = I_r} \sum_{k=1}^{K} \|U^T A_k V\|_F^2 \quad (12)$$

where a two-sided transform is performed.

Preferably, the processing method in accordance with an embodiment of the present invention involves processing, the plurality of matrices thereby obtaining a low-rank approximation of the plurality of matrices with an approximation process, and the approximation process may include a greedy pursuit approximation process.

The analysis and processing of the matrices may begin after transformation of these source electronic data is completed, the matrix representation of the electronic data may then be processed with the approximation process after a decomposition process. Preferably, the step of decomposing the matrix representation into a series of matrix approximations includes a non-orthogonal decomposition of the plurality of matrices, wherein the non-orthogonal decomposition includes a joint diagonal decomposition.

In this example, the Greedy Pursuit (GP) approximation process includes decomposing the r-term approximation into a series of rank-one approximations. At each iteration, the greedy algorithms perform robust rank-one approximation in the $\ell_p$-space of the residual matrices obtained from the previous iteration. Then, the rank-one matrices are subtracted from the residuals and never revisited.

The $\ell_p$-GP approximation process for RLRAMM may be performed as described in Algorithm 1. It works in an iterative fashion. Preferably, the method comprises a step of representing a solution associated with the matrix representation and the K residual matrices as $(u_i, v_i, s_i)$ and $\{R_k^i\}_{k=1}^K$ at the ith iteration step. In the ith iteration step, the GP finds the rank-one approximation of $\{R_k^{i-1}\}_{k=1}^K$, which is formally expressed as $$\min f(s, u, v) := \sum_{k=1}^{K} \|s_k u v^T - R_k^{i-1}\|_p^p \quad (13)$$

where $s = [s_1, \cdots, s_K]^T$ collects the K variables $\{s_k\}_{k=1}^K$ to be optimized. The updating equations are:

$$(s_i, u_i, v_i) = \arg\min_{(s,u,v)} \sum_{k=1}^{K} \|s_k u v^T - R_k^{i-1}\|_p^p \quad (14)$$

and $$R_k^i = R_k^{i-1} - s_{k,i} u_i v_i^T, k = 1, \cdots, K. \quad (15)$$

When the target rank r is given or can be estimated, the algorithm terminates when i>r. If the rank information is unavailable, the normalized objective function (NOF), which corresponds to the sum of the pth power of the $\ell_p$-norms of the K residual matrices, is employed as the stopping criterion:

$$NOF = \frac{\sum_{k=1}^{K} \|R_k^i\|_p^p}{\sum_{k=1}^{K} \|A_k\|_p^p} \leq \delta \quad (16)$$

where $\delta>0$ is the tolerance. The remaining problem is to efficiently solve the rank-one approximation of multiple matrices in the sense of $\ell_p$-minimization, which is presented as follows.

---
Algorithm 1 $l_p$-GP for RLRAMM
---

Input: Matrices $\{A_k\}_{k=1}^K$ and target rank r.
  Initialization: Set residual $R_k^0 = A_k$ for k = 1, ..., K.
  for i = 1, 2, ..., r do
    Solve $l_p$-rank-one fitting $$(s_i, u_i, v_i) = \arg\min_{(s,u,v)} \sum_{k=1}^{k} \|s_k uv^T - R_k^{i-1}\|_p^p$$

Update residual
    $R_k^i = R_k^{i-1} - s_{k,i} u_i v_i^T$, k = 1, ..., K.
  end for
Output: U $[u_1, \ldots, u_r]$, V = $[v_1, \ldots, v_r]$, and $\{s_i\}_{i=1}^r$.

---

Preferably, the method may further comprises the step of determining a weighted median in the $\ell_1$-GP approximation process.

For the purpose of simplicity, the superscript $(\bullet)^{i-1}$ of $R_k^{i-1}$ may be omitted and (13) may be rewritten as $$\min f(s, u, v) := \sum_{k=1}^{K} \|s_k uv^T - R_k\|_p^p. \tag{17}$$

The rank-one approximation of (17) may not be easy to solve since $s_k uv^T$ is nonconvex and the $\ell_p$-norm is nonsmooth when $p \leq 1$. Here, the task is to robustly find the common dominant (rank-one) principal component of $\{R_k\}_{k=1}^K$. By observing that there are three vectors to be optimized in (17), a successive minimization strategy may be used to solve it.

Preferably, the objective function is minimized over one vector while the other two vectors are fixed. For example, at the (j+1)th (j=0, 1, • • •) iteration, f is successively minimized over s, u, and v:

$$s^{j+1} = \arg\min_s f(s, u^j, v^j) \tag{18}$$

$$u^{j+1} = \arg\min_u f(s^{j+1}, u, v^j) \tag{19}$$

$$v^{j+1} = \arg\min_v f(u^{j+1}, s^{j+1}, v). \tag{20}$$

Observing that $\{s_k\}_{k=1}^K$ are decoupled with each other and can be solved independently, for fixed $u^j$ and $v^j$, the optimal $s_k$ minimizing the kth term of (18) is given by $$s_k^{j+1} = \arg\min_{s_k \in \mathbb{R}} \|s_k u^j (v^j)^T - R_k\|_p^p \tag{21}$$

which amounts to the following scalar minimization problem $$s_k^{j+1} = \arg\min_{s_k \in \mathbb{R}} \|s_k b^j - r_k\|_p^p \tag{22}$$

where $r_k = \text{vec}(R_k) \in \mathbb{R}^{mn}$ and $b^j = \text{vec}(u^j (v^j)^T) \in \mathbb{R}^{mn}$. When p=2, $s_k^{j+1}$ has the following closed-form solution $$s_k^{j+1} = \frac{\langle b^j, r_k \rangle}{\langle b^j, b^j \rangle} = \frac{(u^j)^T R_k v^j}{\|u^j\|^2 \|v^j\|^2} \tag{23}$$

which merely needs $\mathcal{O}$ (mn) operations. When p=1, denoting the lth elements of $b^j$ and $r_k$ as $b^j(l)$ and $r_k(l)$, respectively, (22) may be rewritten as $$\min_{s_k} \sum_{l=1}^{mn} |b^j(l)| \left| s_k - \frac{r_k(l)}{b^j(l)} \right| \tag{24}$$

where $|b^j(l)| > 0$ is the positive weight. Note that the zero element of $b^j$ has no effect on the minimizer of (22). As a result, without loss of generality, it is assumed that $b^j$ does not contain zero elements when finding the minimizer of (22). Defining $$t_k(l) = \frac{r_k(l)}{b^j(l)}, l = 1, \cdots, mn. \tag{25}$$

The optimal solution of (24) is the weighted median of $t_k$ associated with the weight $|b^j|$. The following notation:

$$s_k^{j+1} = \text{WMED}(|b^j|, t_k) \tag{26}$$

maybe used to represent the weighted median, which can be computed by Algorithm 2 as shown below.

The major operation in the weighted median calculation is to sort the weighting coefficients. Thus, the computational complexity for exactly solving (22) with p=1 is $\mathcal{O}$ (mn log(mn)) if the quick sorting algorithm is adopted. Therefore, it is preferable that p=1 and the approximation process is a $\ell_1$-GP approximation process.

---
Algorithm 2 Computation of Weighted Median
---

Input: Weight vector $|b^j|$ and data vector $t_k$.
Output: Weighted median $s_k^{j+1}$ = WMED $(|b^j|, t_k)$.
  1. Determine the threshold $b_0 = \|b^j\|_1 / 2$.
  2. Sort $t_k$ in ascending order with the corresponding concomitant weight $|b^j|$.
  3. Sum the concomitant weights, beginning with $|b^j(1)|$ and increasing the order.
  4. The weighted median is $t_k(q)$ whose weight leads to the inequality $\Sigma^q_{l=1} |b^j(l)| \geq b_0$ to hold first.

---

Alternatively, when p>1, (22) is a scalar convex optimization problem. Since the objective function is twice differentiable and strictly convex, its unique global minimum can be obtained by the iterative gradient or Newton's method. The complexity to obtain an $\epsilon$-accuracy solution is at most $\mathcal{O}$ (mn log(1/$\epsilon$)) where $\epsilon$ is a small positive tolerance, e.g., $10^{-6}$, because the gradient and Newton's methods have a global linear convergence rate at least for smooth convex optimization problems. To exactly solve the more challenging case of 0<p<1 where the objective function is neither differentiable nor convex, an algorithm complexity of $\mathcal{O}$ ($m^2 n^2$) may be needed.

In summary, the complexities for calculating $\{s_k^{j+1}\}_{k=1}^K$ are $\mathcal{O}$ (mnK), $\mathcal{O}$ (mnK log(mn)), $\mathcal{O}$ (mnK log(1/$\epsilon$), and $\mathcal{O}$ ($m^2 n^2 K$) for p=2, p∈1, p∈(1,2), and p∈(0,1), respectively. The choice of p=1 is more robust and computationally simpler than the setting of p∈(1,2). In addition, the choice of p<1 results in a quadratic complexity and it is not preferred unless the noise is very impulsive. Thus, it is preferred to choose p=1 by taking into account both robustness and complexity.

Denoting $c_k^j = s_k^{j+1} v^j \in \mathbb{R}^n$, (19) may be rewritten as $$\min_{u \in \mathbb{R}^m} \sum_{k=1}^{K} \|c_k^j u^T - R_k^T\|_p^p \quad (27)$$

which amounts to the following m independent scalar minimization problems:

$$\min_{u_l \in \mathbb{R}} \sum_{k=1}^{K} \|c_k^j u_l - R_k^T(:,l)\|_p^p, \, l = 1, \cdots, m \quad (28)$$

where $u_l$ is the lth entry of u and $R_k^T(:,l)$ stands for the lth column of $R_k^T$. Defining $(c^j)^T = [(c_1^j)^T, \cdots, (c_K^j)^T]$ and collecting $R_1^T(:,l), \cdots, R_K^T(:,l)$ into a vector $g_l \in \mathbb{R}^{nK}$, $u_l$ is updated by $$u_l^{j+1} = \operatorname*{argmin}_{u_l \in \mathbb{R}} \|u_l c^j - g_l\|_p^p, \, l = 1, \cdots, m \quad (29)$$

which can be solved with the use of the same method for solving (22). The complexities for calculating $\{u_l^{j+1}\}_{l=1}^m$ are $\mathcal{O}$ (mnK), $\mathcal{O}$ (mnK log(nK)), $\mathcal{O}$ (mnK log(1/ϵ)), and $\mathcal{O}$ (mn²K²) for p=2, p=1, p∈(1,2), and p∈(0,1), respectively. Similarly, the qth element of v, i.e., $v_g$ is updated by $$v_q^{j+1} = \operatorname*{argmin}_{v_q \in \mathbb{R}} \|v_q d^j - h_q\|_p^p, \, q = 1, \cdots, n \quad (30)$$

where $(d^j)^T = [(d_1^j)^T, \cdots, (d_K^j)^T]$ with $d_k^j = s_k^{j+1} u^{j+1} \in \mathbb{R}^m$ and $h_q \in \mathbb{R}^{mK}$ is formed by concatenating $R_1(:,q), \cdots, R_K(:,q)$. It is seen that the complexities for calculating $\{v_q^{j+1}\}_{l=1}^n$ are $\mathcal{O}$ (mnK), $\mathcal{O}$ (mnK log(mK)), $\mathcal{O}$ (mnK log(1/ϵ)), and $\mathcal{O}$ (m²nK²) for p=2, p=1, p∈(1,2), and p∈(0,1), respectively. The per-iteration costs of the $\ell_p$-rank-one approximation with p=1 and p∈(0,1) are $\mathcal{O}$ (mnK(log(mn)+log(nK)+log(mK)))=$\mathcal{O}$ (mnK log(m²n²k²))=$\mathcal{O}$ (mnK log(mnK)) and $\mathcal{O}$ (m²n²K+mn²K²+m²nK²)=$\mathcal{O}$ (mnKmax²(m, n, K)), respectively.

The approximation process may also include a linear regression process, which may include the step of determining a best rank-one approximation of a plurality of residual matrices in each of a plurality of iteration steps in the approximation process. The process for solving the rank-one fitting of multiple matrices of (17) is summarized in Algorithm 3, where $N_{iter}$ is the number of iterations for convergence.

In one example, several tens of iterations should be enough to converge with high accuracy. Furthermore, $N_{iter}$ can be viewed as a constant independent of the dimension. Since (17) is nonconvex, the final convergence result relies on the initial values $u^0$ and $v^0$ theoretically. However, it is observed that random Gaussian initialization may also achieve good performance.

---

Algorithm 3 $l_p$-Rank-One Fitting of Multiple Matrices

Input: Matrices $\{R_k\}_{k=1}^K$.
 Initialization: Set $u^0$ and $v^0$ randomly.
 Form $$r_k = vec(R_k), \, g_l = \begin{bmatrix} R_1^T(:,l) \\ \vdots \\ R_K^T(:,l) \end{bmatrix}, \, h_q = \begin{bmatrix} R_1(:,q) \\ \vdots \\ R_K(:,q) \end{bmatrix}$$

for k = 1, ..., K, l = 1, ..., m, and q = 1, ..., n.
 for j = 0, 1, 2, ... do
  Form $b^i$ = vec $(u^i(v^j)^T)$.
  Update s:

$$s_k^{j+1} = \arg \min_{s_k \in \mathbb{R}} \|s_k b^i - r_k\|_p^p, \, k = 1, \ldots, K.$$

Form $(c^j)^T = [(c_1^j)^T, \ldots, (c_K^j)^T]$ with $c_k^j = s_k^{j+1} v^j$.
  Update u:

$$u_l^{j+1} = \arg \min_{u_l \in \mathbb{R}} \|u_l c^j - g_l\|_p^p, \, l = 1, \ldots, m.$$

Form $(d^j)^T = [(d_1^j)^T, \ldots, (d_K^j)^T]$ with $d_k^j = s_k^{j+1} u^{j+1}$.
  Update v:

$$v_q^{j+1} = \arg \min_{v_q \in \mathbb{R}} \|v_q d^j - h_q\|_p^p, \, q = 1, \ldots, n.$$

Stop until convergence satisfies.
 end for
Output: $(s^{j+1}, u^{j+1}, v^{j+1})$.

---

The inventors has compared the performances including compression ratios and computational complexities of different methods such as PCA, RPCA, 2DPCA, GLRAM, and the $\ell_p$-GP method with different values of p in Table I.

It was observed that the complexity of a preferable setting of p=1 is near-linear with the number and dimension of the matrices. Thus, the $\ell_1$-GP approximation process which exhibits good robustness to outliers is near-scalable to problem size. The $N_{RPCA}$ is the number of iterations of the ALM applied to solving the RPCA for convergence. ALM is a first-order method and its convergence rate is generally slow. Thus, $N_{RPCA}$ may be large for attaining a satisfactory solution.

TABLE I

Compression ratio and computational complexity.

| Method | Compression ratio | Complexity |
| --- | --- | --- |
| PCA | $\dfrac{mnK}{(mn+K+1)r}$ | $\mathcal{O}$ (max(m²n², K²)r) |
| RPCA | $\dfrac{mnK}{(mn+K+1)r}$ | $\mathcal{O}$ (max(mn, K)³$N_{RPCA}$) |
| 2DPCA | $\dfrac{mnK}{(mK+n)r}$ | $\mathcal{O}$ (mn² K) |
| GLRAM | $\dfrac{mnK}{(m+n+Kr)r}$ | $\mathcal{O}$ ((m + n)²Kr$N_{iter}$) |
| $l_2$-GP | $\dfrac{mnK}{(m+n+K)r}$ | $\mathcal{O}$ (mnKr$N_{iter}$) |
| $l_1$-GP | $\dfrac{mnK}{(m+n+K)r}$ | $\mathcal{O}$ (mnK log(mnK)r$N_{iter}$) |

TABLE I-continued

Compression ratio and computational complexity.

| Method | Compression ratio | Complexity |
|---|---|---|
| $p \in (1, 2)$ | $\dfrac{mnK}{(m+n+K)r}$ | $\mathcal{O}(mnK \log(1/\epsilon) r N_{iter})$ |
| $p \in (0, 1)$ | $\dfrac{mnK}{(m+n+K)r}$ | $\mathcal{O}(mnK \max^2(m, n, K) r N_{iter})$ |

The approximation process includes a $\ell_p$-norm minimization process, wherein $p \in (0,2]$. $\ell_p$-correlation may be referenced to prove the convergence of the $\ell_p$-GP approximation method. The normalized $\ell_p$-correlation coefficient of two vectors a and b is $$\theta_p(a, b) \triangleq 1 - \frac{\min_{\alpha \in \mathbb{R}} \|b - \alpha a\|_p^p}{\|b\|_p^p} \quad (31)$$

which satisfies $0 \le \theta_p(a, b) \le 1$. When $\theta_p(a, b)=0$, a and b are called $\ell_p$-orthogonal. When $\theta_p(a, b)=1$, a and b are colinear, i.e $b = \beta a$ with $\beta \in \mathbb{R}$. If a or b is random, the probability of $b\theta_p(a, b)=0$ and $b\theta_p(a, b)=1$ is zero. That is, it follows $0 < \theta_p(a, b) < 1$. When $p=2$, $\theta_p(a, b)$ has the closed-form expression of $$\theta_2(a, b) = \frac{\langle a, b \rangle^2}{\|a\|^2 \|b\|^2} \quad (32)$$

Based on (31):

$$\left\{ \min_{\alpha \in \mathbb{R}} \|b - \alpha a\|_p^p \right\} = (1 - \theta_p(a, b)) \|b\|_p^p. \quad (33)$$

The larger $\theta_p(a, b)$, the more "similar" (correlated) a and b are in the $\ell_p$-space and the smaller value $\{\min_\alpha \|b - \alpha a\|_p^p\}$ can attain.

In one example embodiment, at the (j+1)th iteration of Algorithm 3 for solving the rank-one approximation to $\{R_k^{i-1}\}_{k=1}^K$, the objective function achieves) a decrease of $$f(s^{j+1}, u^{j+1}, v^{j+1}) \le \zeta_{i-1}^j \sum_{k=1}^K \|R_k^{i-1}\|_p^p \quad (34)$$

where $0 < \varsigma_{i-1}^j < 1$ is the decay factor of the (j+1)th iteration, whose subscript $(\cdot)_{i-1}$ implies that its value relates to $\{R_k^{i-1}\}_{k=1}^K$. Algorithm 3 monotonically decreases the objective function, indicating that $\{\varsigma_{i-1}^j\}$ is a monotonically decreasing sequence. After $i = N_{iter}$ or $j \to \infty$ iterations, the minimum that Algorithm 3 finds is guaranteed as $$\sum_{k=1}^K \|R_k^i\|_p^p = \min_{s,u,v} f(s, u, v) \le \zeta_{i-1} \sum_{k=1}^K \|R_k^{i-1}\|_p^p \quad (35)$$

With $\zeta_{i-1} = \zeta_{i-1}^{N_{iter}}$ or $\zeta_{i-1} = \lim_{j \to \infty} \zeta_{i-1}^j$ and $0 < \zeta_{i-1} < 1$.

It is seen that minimizing f with respect to s at the jth iteration in Algorithm 3 yields $$\left\{ \min_{s \in \mathbb{R}^K} f(s, u^j, v^j) \right\} = \sum_{k=1}^K \min_{s_k \in \mathbb{R}} \|s_k b^j - r_k\|_p^p \quad (36)$$

$$= \sum_{k=1}^K (1 - \theta_p(b^j, r_k)) \|r_k\|_p^p$$

$$\le \alpha_p(b^j) \sum_{k=1}^K \|r_k\|_p^p$$

$$= \alpha_p(b^j) \sum_{k=1}^K \|R_k^{i-1}\|_p^p$$

where $$\alpha_p(b^j) = \max_{1 \le k \le K} (1 - \theta_p(b^j, r_k)) \quad (37)$$

and $\|r_k\|_p^p = \|R_k^{i-1}\|_p^p$ due to $r_k = \text{vec}(R_k^{i-1})$. Observing that $b^j$ is random since the initialization is random, $1 < \theta_p(b^j, r_k) < 1$ and thus, $0 < \alpha_p(b^j) < 1$ may be determined. This yields a strict decrease of the objective function. Similarly, minimizing f with respect to u leads to $$\left\{ \min_{s \in \mathbb{R}^m} f(s^{j+1}, u, v^j) \right\} = \sum_{k=1}^m \min_{s_k \in \mathbb{R}} \|u_l c^j - g_l\|_p^p \quad (38)$$

$$= \sum_{l=1}^m (1 - \theta_p(c^j, g_l)) \|g_l\|_p^p$$

$$\le \beta_p(c^j) \sum_{l=1}^m \|g_l\|_p^p$$

$$= \beta_p(c^j) \sum_{k=1}^K \|R_k^{i-1}\|_p^p$$

where $$\beta_p(c^j) = \max_{1 \le l \le m} (1 - \theta_p(c^j, g_l)) \quad (39)$$

and $\sum_{l=1}^m \|g_l\|_p^p = \sum_{k=1}^K \|R_k^{i-1}\|_p^p$ has been used. Again, $0 < \beta_p(c^j) < 1$ results in a strict decrease of the objective function. Minimizing f with respect to v yields $$\left\{ \min_{s \in \mathbb{R}^n} f(s^{j+1}, u^{j+1}, v) \right\} = \sum_{q=1}^n \min_{v_q \in \mathbb{R}} \|v_q d^j - h_q\|_p^p \quad (40)$$

$$= \sum_{q=1}^n (1 - \theta_p(d^j, h_q)) \|h_q\|_p^p$$

$$\le \gamma_p(d^j) \sum_{l=1}^m \|h_q\|_p^p$$

$$= \gamma_p(d^j) \sum_{k=1}^K \|R_k^{i-1}\|_p^p$$

where

-continued $$\gamma_p(d^j) = \max_{1 \leq q \leq n}(1 - \theta_p(d^j, h_q)) \quad (41)$$

and $\Sigma_{q=1}{}^n = \|h_q\|_p{}^p = \Sigma_{k=1}{}^K \|R_k{}^{i-1}\|_p{}^p$ has been used. Once again, $0 < \gamma_p(d^j) < 1$ strictly decreases the objective function. Combining (36), (38) and (40), (42) may be further obtained as $$f(s^{j+1}, u^{j+1}, v^{j+1}) \leq \alpha_p(b^j)\beta_p(c^j)\gamma_p(d^j) \sum_{k=1}^{K} \|R_k^{i-1}\|_p^p = \zeta_{i-1}^j \sum_{k=1}^{K} \|R_k^{i-1}\|_p^p \quad (42)$$

and hence the upper bound of the minimum in (35) by incorporating (17).

It should be noted that the decay ratio $0 < \zeta_{i-1} < 1$ depends on the $\ell_p$-correlation of the intermediate variables and the vectorization forms of the residual matrices $\{R_k^{i-1}\}_{k=1}^{K}$. The iterates approximate the common principal component of $\{R_k^{i-1}\}_{k=1}^{K}$ better as the iteration progresses. Hence, the $\ell_p$-correlation of the iterates and the principal component is improved and the decay ratio $\zeta_{i-1}$ becomes smaller.

Preferably, the objective function of the $\ell_p$-GP for RLRAMM in Algorithm 1 decays exponentially:

$$\sum_{k=1}^{K} \|R_k^i\|_p^p \leq \rho^i \sum_{k=1}^{K} \|A_k\|_p^p \quad (43)$$

for the iteration number $i = 0, 1, 2, \cdots$, where $0 < \rho < 1$ is a worst-case bound of the convergence rate.

By applying (35), it may be further determined that:

$$\sum_{k=1}^{K} \|R_k^i\|_p^p \leq \left(\prod_{l=0}^{i-1} \zeta_l\right) \sum_{k=1}^{K} \|R_k^0\|_p^p = \rho^i \sum_{k=1}^{K} \|A_k\|_p^p \quad (44)$$

where $$\rho = \max_{0 \leq l \leq i-1} \zeta_l \quad (45)$$

and $R_k^0 = A_k$ has been used. Since the decay ratio satisfies $0 < \rho < 1$, the reconstruction error strictly decreases at each iteration and the GP algorithm converges with a worst decay rate of $\rho$.

The decay rate $0 < \rho < 1$ depends on the $\ell_p$-correlation of the intermediate variables $(s, u, v)$ and the vectorization forms of the residual matrices $\{R_k^{i-1}\}_{k=1}^{K}$. The higher the correlation is, the faster the algorithm converges. By applying the proofs discussed above, the reconstruction error approaches zero:

$$\lim_{i \to \infty} \sum_{k=1}^{K} \|R_k^i\|_p^p = 0 \quad (46)$$

due to $\rho \in (0,1)$. This implies that the stopping criterion in (16) is well defined for any $\delta > 0$. Obviously, (46) also indicates $$\lim_{i \to \infty} \|R_k^i\|_p^p = 0, \text{ and } \lim_{i \to \infty} R_k^i = 0, k = 1, \ldots, K. \quad (47)$$

As a direct conclusion obtained from above discussion, the following corollary allows an infinite series expansion for an arbitrary set of matrices $\{A_k\}_{k=1}^{K}$.

For any matrix set $\{A_k\}_{k=1}^{K}$, the $\ell_p$-GP approximation process leads to an infinite series expansion, which is shown as $$A_k = \sum_{i=1}^{\infty} s_{k,i} u_i v_i^T, k = 1, \ldots, K \quad (48)$$

Where $(u_i, v_i, s^i)$ is the result obtained by Algorithm 1 at the ith iteration.

The application of the residual update formula of (15) results in $$R_k^i = R_k^{i-1} - s_{k,i} u_i v_i^T \quad (49)$$

$$= R_k^0 - \sum_{l=1}^{i} s_{k,l} u_l v_l^T$$

$$= A_k - \sum_{l=1}^{i} s_{k,l} u_l v_l^T$$

which means:

$$A_k = \sum_{l=1}^{i} s_{k,l} u_l v_l^T + R_k^i. \quad (50)$$

Exploiting $$\lim_{i \to \infty} R_k^i = 0$$

in (47) and taking limits as $i \to \infty$ on both sides of (50) yields (48).

The inventors has performed experiments to evaluate the performances and advantages of the method for processing electronic data in accordance with embodiments of the present invention. In the experiments, the simulation and experiments were conducted using a computer with a 2.2 GHz CPU and 4 GB memory. In addition to synthetic random data, the following three example databases, including two face datasets, and one object dataset, are used in the experiments.

In a first experiment performed, the ORL face database was processed and analysed. The database consists of 10 different images for each of 40 distinct subjects, and thus there are a total of 400 images. The resolution of the gray-scale images is 112×92, indicating that m=92, n=112, and K=400.

In a second experiment performed, the Georgia Tech face database was processed and analysed. The database contains 750 images of 50 individuals. There are 15 images for each individual. As the original images are colored and with different sizes, we convert them to gray-scale with the same dimensions of 111×156, corresponding to m=156, n=111, and K=750.

In a third experiment performed, the COIL-20 database was processed and analysed. The database includes 1440 gray-scale images of 20 different objects, which corresponds to 72 images per object. The image resolution is 128×128 and it follows m=n=128 and K=1440.

The normalized mean square error (NMSE):

$$NMSE = \frac{\sum_{k=1}^{K} \|US_k V^T - A_k^0\|_F^2}{\sum_{k=1}^{K} \|A_k^0\|_F^2} \quad (51)$$

is adopted as the performance measure, where $\{A_k^0\}_{k=1}^K$ are the true (noiseless) matrices. The noisy observed version is $A_k = A_k^0 + N_k$ where $N_k$ is the noise matrix containing outliers.

The convergence behaviors are investigated using synthesized random data. The parameters are set as m=40, n=50, and K=20 in the process. By transforming the database to a matrix representation including a plurality of matrices, a set of noise-free matrices of rank 10 is generated by $A_k^0 = US_k V^T$, k=1, • • •, K, where the entries of $U \in \mathbb{R}^{m \times 5}$ and $V \in \mathbb{R}^{5 \times n}$ satisfy the standard Gaussian distribution while the diagonal entries of $S_k$ are uniformly distributed in [1,2] to avoid any diagonal entry being too close to zero. Then, the noise matrices $N_k$ are added to $A_k^0$ to produce $A_k$. Each entry of $N_k$ satisfies the two-term zero-mean Gaussian mixture model (GMM) whose probability density function is given by $$p_v(v) = \sum_{i=1}^{2} \frac{c_i}{\sqrt{2\pi} \sigma_{v_i}} \exp\left(-\frac{v^2}{2\sigma_{v_i}^2}\right) \quad (52)$$

where $0 \leq c_i \leq 1$ and $\sigma_{v_i}^2$ are the probability and variance of the ith term, respectively, with $c_1+c_2=1$. If $\sigma_{v_1}^2 \ll \sigma_{v_2}^2$ and $c_2 \ll c_1$ are selected, large noise samples of variance $\sigma_{v_2}^2$ occurring with a smaller probability $c_2$ can be viewed as outliers embedded in Gaussian background noise of variance $\sigma_{v_1}^2$. Thus, the GMM well models the phenomenon with both Gaussian noise and outliers. The total noise variance is $\sigma_v^2 = \Sigma_i c_i \sigma_{v_i}^2$ and the signal-to-noise ratio (SNR) is defined as $SNR = (\Sigma_{k=1}^K \|A_k^0\|_F^2)/(mnK\sigma_v^2)$.

Figure 2:
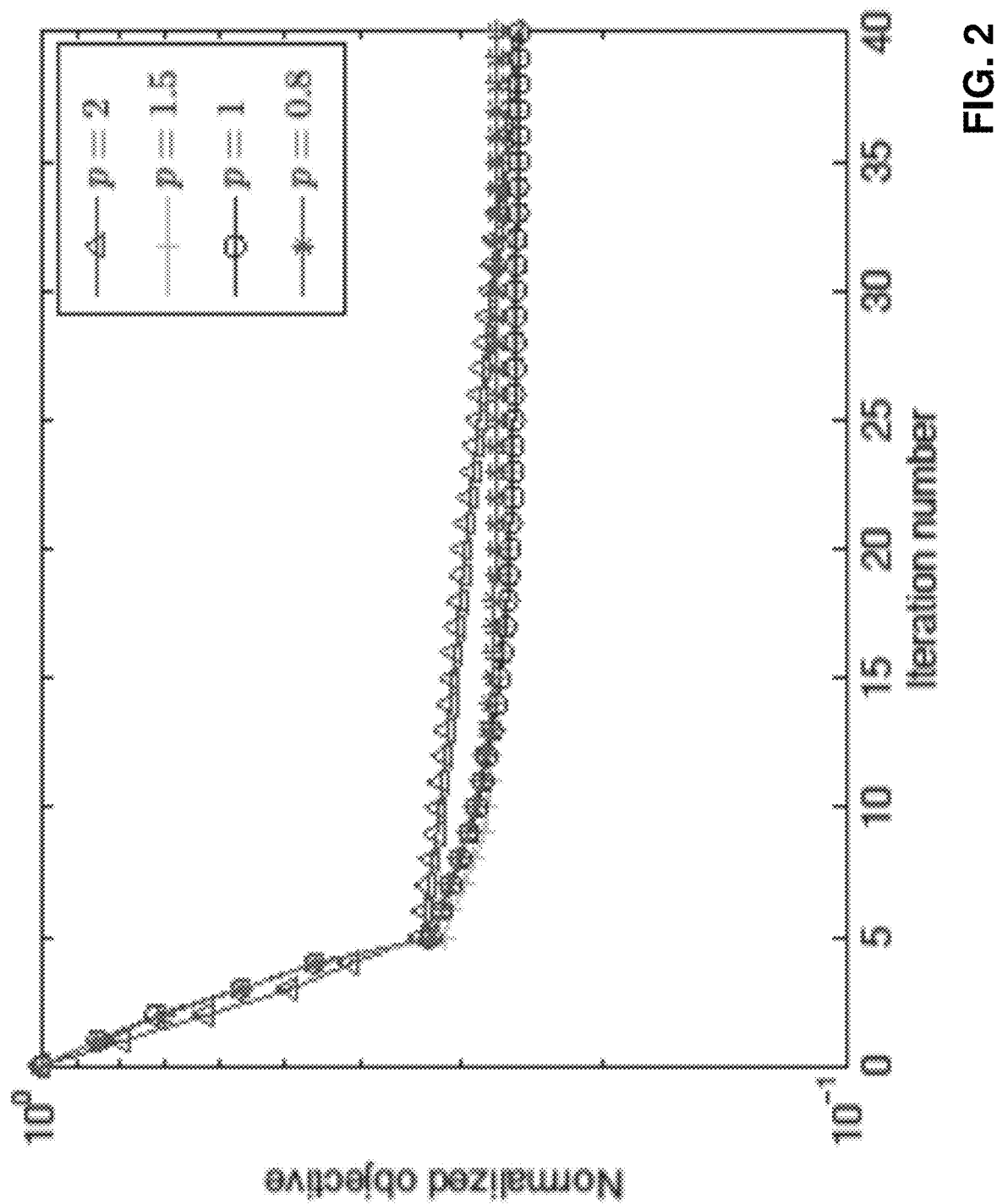
FIG. 2 is a plot showing normalized objective function versus iteration number involved in the method used in accordance with one embodiment of the present invention.
Figure 3:
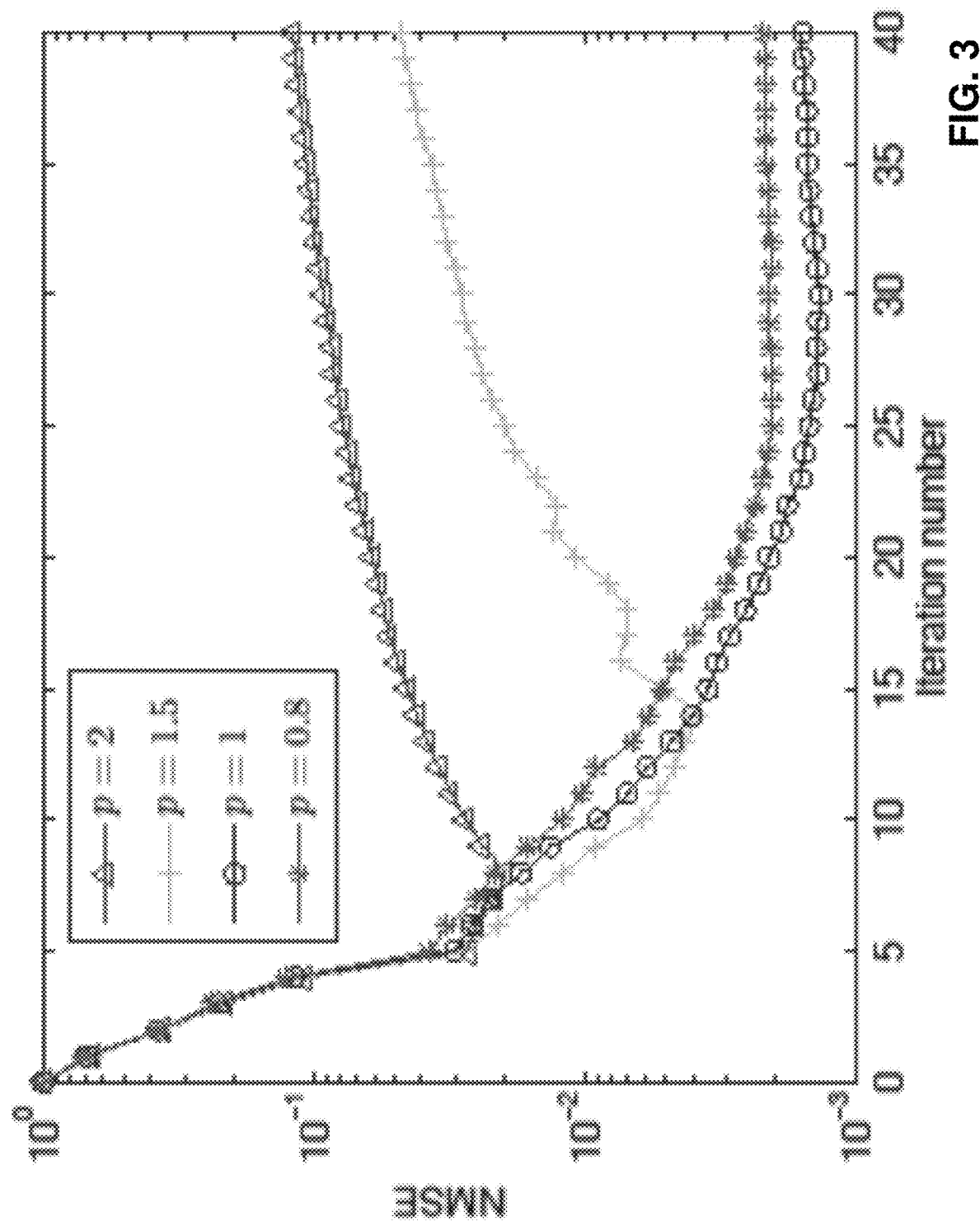
FIG. 3 is a plot showing normalized mean square error (NMSE) versus iteration number involved in the method used in accordance with one embodiment of the present invention.

With reference to FIGS. 2 and 3, there is shown plots of the NOF defined in (16) and NSME versus iteration number with p=2, 1.5, 1, and 0.8 at SNR=3 dB, respectively. Note that the NOF is different from the NMSE. The former uses the noisy observations but the latter employs the true matrices. The latter reflects the estimation accuracy while the former does not.

It may be observed that the objective functions for all values of p monotonically decrease, which validates the previous discussions. The NMSE rapidly decreases when i≤5. For p=1 and p=0.8, the NMSE continues to decrease to a lower value after capturing the dominant low-rank structure, achieving a robust estimation. But for p=2 and p=1.5, the NMSE cannot further decrease. As the iteration progresses, the NMSEs of p=2 and p=1.5 even increase, implying that overfitting is easier to appear for larger p. Therefore, the $\ell_p$-GP with larger p is not robust against to outliers while that with p=1 or smaller has good robustness.

In accordance with an embodiment of the present invention, the system for processing electronic data may be used for processing digital image data. In this embodiment, the method for processing digital image data comprises the steps of: transforming the digital image data to a matrix representation including a plurality of matrices; decomposing the matrix representation into a series of matrix approximations; processing, with an approximation process, the plurality of matrices thereby obtaining a low-rank approximation of the plurality of matrices; and constructing at least one digital image based on the low-rank approximation of the plurality of matrices.

The digital image data may represent at least two source images with noise and/or defect.

In another experiment performed by the inventors, the performances of an image reconstruction process of the $\ell_p$-GP method in accordance with the present invention are compared with the PCA, RPCA, 2DPCA, and GLARM methods in the presence of outliers.

For RPCA, after separating the outlier components, the truncated SVD is performed to calculate principal components to achieve data compression. When processing image data, the pixel values are linearly map from [0,255] to [−0.5,0.5], which is achieved by $A_k \to A_k/255-0.5$. The outliers which are modelled by the salt-and-pepper noise, are added to the images to produce the observations.

The function "imnoise ($A_k$, 'salt & pepper', $\sigma_n^2$)" in MATLAB was used, where the normalized noise intensity is $\sigma_n^2$ corresponding to SNR=$1/\sigma_n^2$, to generate the salt-and-pepper noise. For fair comparison, the NMSEs of the six methods are computed under the same (or close) compression ratios. According to Table I, $r_1$, $r_2$, $r_3$, and $r_4$, which are the target ranks of PCA/RPCA, 2DPCA, GLARM, and $\ell_p$-GP, respectively, should satisfy $$(mn+K+1)r_1 = (mK+n)r_2 = (m+n+Kr_3)r_3 = (m+n+K)r_4 \quad (53)$$

to achieve comparable compression ratios in the six methods. Noting that $r_1$, • • •, $r_4$ are positive integers, (53) may not be strictly satisfied. The positive integers were selected such that the compression ratios are as close as possible.

Figure 4:
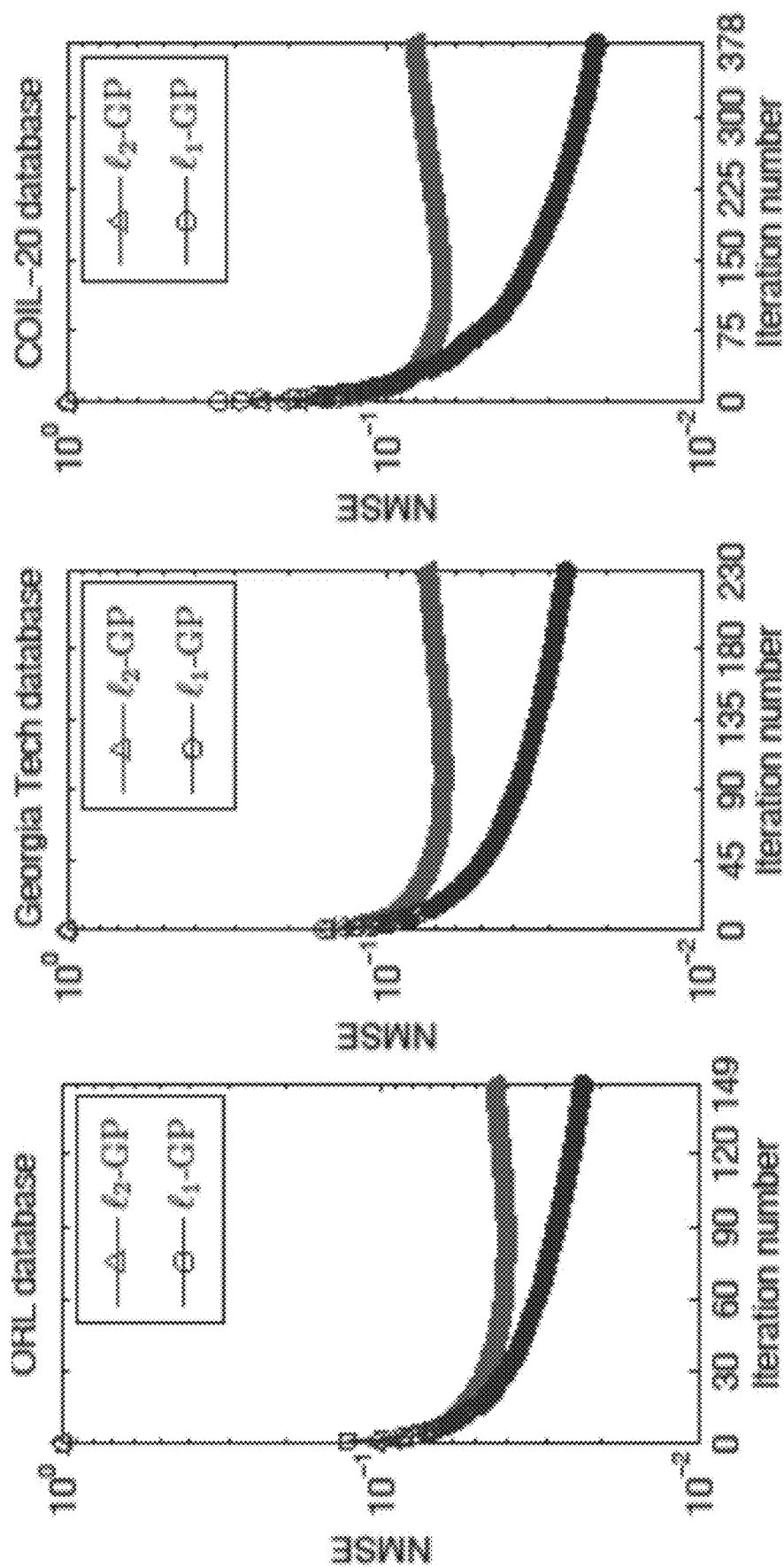
FIG. 4 are plots showing NMSEs versus iteration number of $\ell_2$-GP and $\ell_1$-GP for ORL, Georgia Tech, and COIL-20 databases.

SNR=6 dB was set in the experiments. With reference to FIG. 4, the NMSEs versus iteration number on the three example image databases. It is observed that the $\ell_2$-GP and $\ell_1$-GP significantly decrease the NMSE at the beginning stage. This implies that these example images in the databases exhibit several "principal components" and the $\ell_1$-GP successfully captures these components although they are not strictly low-rank. The ranks r are set to 149, 231, and 378 for the ORL, Georgia Tech, and COIL-20 databases, respectively.

To achieve a sufficiently small NMSE, r may be required to be larger than min(m,n). Again, the $\ell_1$-GP is much more robust to outliers than the $\ell_2$-GP since the former attains much smaller NMSEs.

Figure 5:
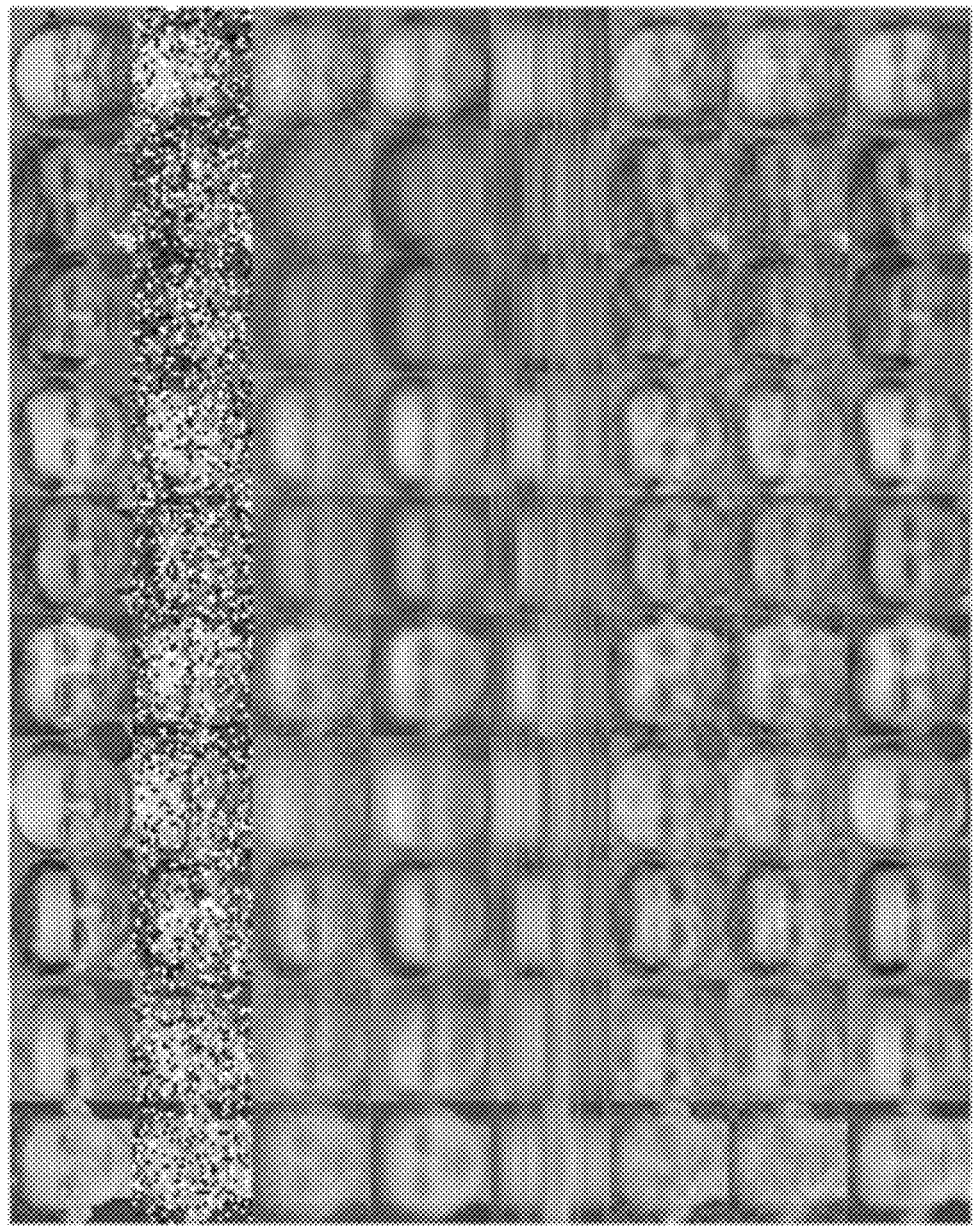
FIG. 5 is a combined image showing samples of original, noisy, and reconstructed images for ORL face database.
Figure 6:
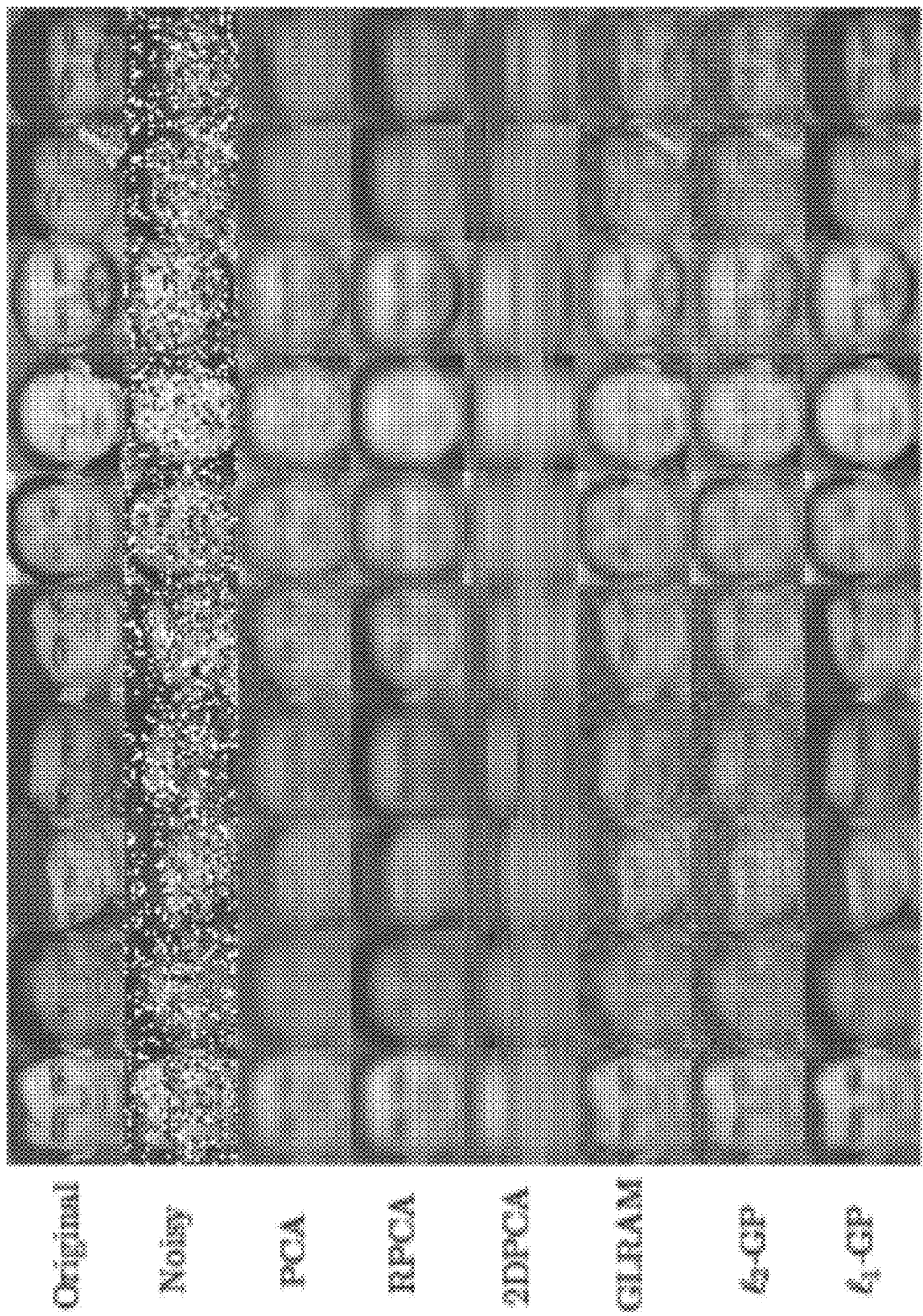
FIG. 6 is a combined image showing samples of original, noisy, and reconstructed images on Georgia Tech face database.
Figure 7:
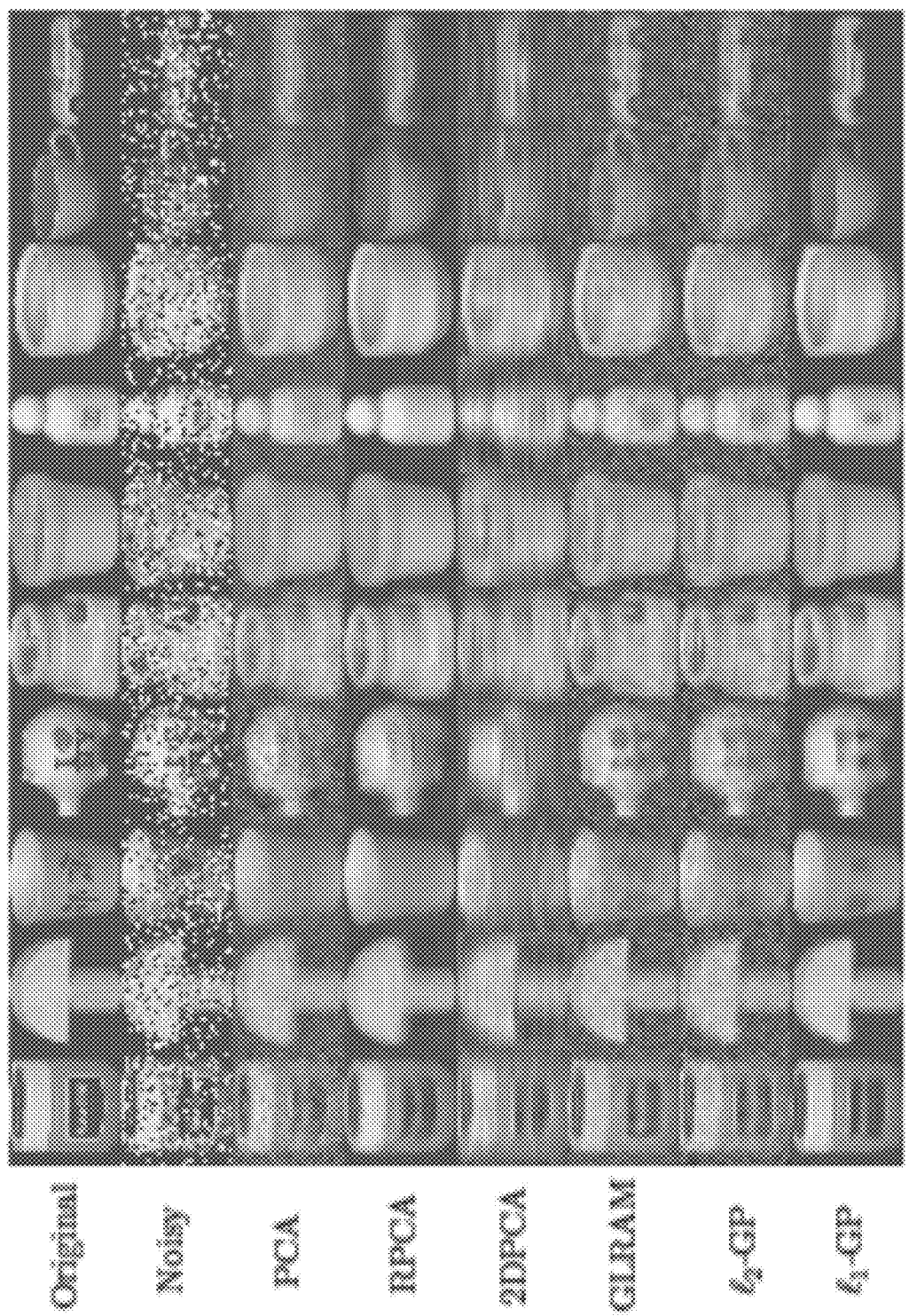
FIG. 7 is a combined image showing samples of original, noisy, and reconstructed images for COIL-20 database.

The ranks, compression ratios, and NMSEs of the PCA, RPCA, 2DPCA, GLARM and $\ell_2$-GP for the three image databases, are listed in Table II. With reference to FIGS. 5, 6 and 7, several samples of the reconstructed images obtained by the six algorithms on the ORL, Georgia Tech, and COIL-20 databases, respectively, are shown. The corresponding samples of the original and noisy images are also shown for comparison. Advantageously, the $\ell_1$-GP has the best performance in the presence of outliers. The RPCA may also exhibit robustness against outliers, it is inferior to the $\ell_1$-GP. Among the four non-robust methods, the GLRAM and $\ell_2$-GP perform better than the PCA and 2DPCA under similar compression ratios.

TABLE II

Compression ratio and NMSE.

|  |  | PCA | RPCA | 2DPCA | GLRAM | $l_2$-GP | $l_1$-GP |
|---|---|---|---|---|---|---|---|
| ORL | rank | 8 | 8 | 2 | 15 | 149 | 149 |
|  | Compression ratio | 48.1 | 48.1 | 45.9 | 44.3 | 45.8 | 45.8 |
|  | NMSE ($10^{-2}$) | 6.06 | 4.82 | 6.50 | 3.37 | 4.31 | 2.29 |
| Georgia Tech | rank | 13 | 13 | 2 | 17 | 230 | 230 |
|  | Compression ratio | 55.3 | 55.3 | 55.4 | 58.7 | 55.5 | 55.5 |
|  | NMSE ($10^{-2}$) | 9.20 | 5.75 | 10.26 | 5.68 | 7.24 | 2.68 |
| COIL-20 | rank | 22 | 22 | 4 | 22 | 378 | 378 |
|  | Compression ratio | 31.3 | 31.3 | 32.0 | 33.3 | 32.0 | 32.0 |
|  | NMSE ($10^{-2}$) | 8.51 | 3.94 | 9.61 | 6.42 | 7.98 | 2.16 |

Figure 8:
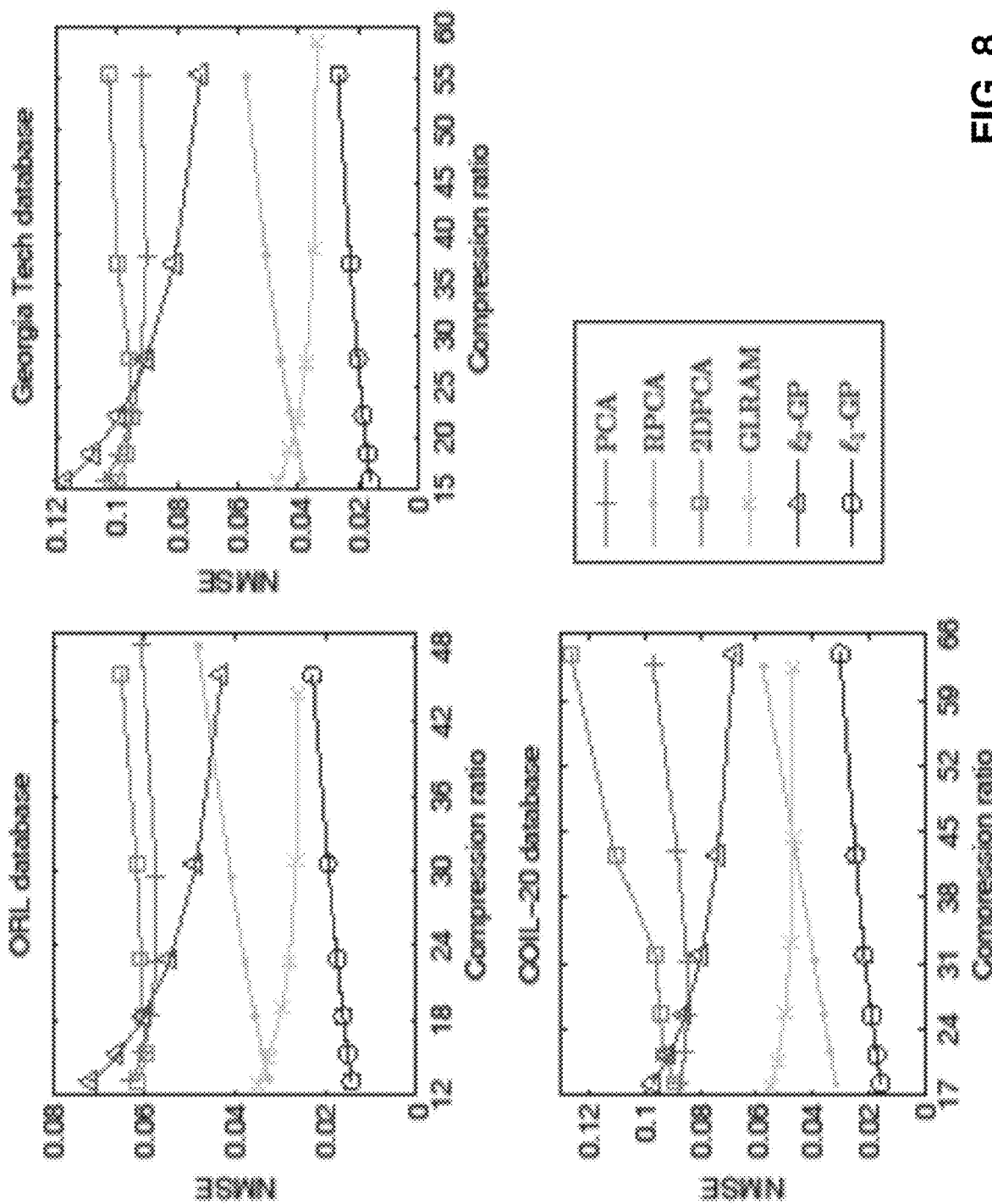
FIG. 8 are plots showing NMSEs of PCA, RPCA, 2DPCA, GLARM, $\ell_2$-GP and $\ell_1$-GP versus compression ratio for three example databases.

With reference to FIG. 8, there is shown a plot showing the NMSEs of the six methods versus compression ratio on the three image databases. It is observed that the $\ell_1$-GP approximation has the best reconstruction performance for all databases. The $\ell_2$-GP loses robustness since the Frobenius norm is sensitive to outliers.

The NMSEs of the two robust methods, namely, RPCA and $\ell_1$-GP methods, monotonically increase with the compression ratio. However, those of the four non-robust methods do not monotonically increase with the compression ratio. Sometimes, lower compression ratios yield worse NMSEs. This is because the non-robust schemes cannot eliminate the adverse effect induced by the outliers. The principal components found by the four methods do not capture the true low-rank structure but reflect the outliers. Despite the low computational cost of the 2DPCA, its performance is not satisfactory because it only uses a single-sided transform resulting in limited compression capability. Although the RPCA is more robust than the PCA, it has a large performance gap compared with the $\ell_1$-GP. Sometimes it is even inferior to the GLRAM. The advantage of 2D based methods over the vectorization based one is evident when handling multiple matrices.

These embodiments may be advantageous in that invention a set of $\ell_p$-GP algorithms with 0<p≤2 for joint low-rank approximation of multiple matrices is provided. Since the multiple matrices are processed directly without vectorization, the approximation process is computationally more efficient than other methods such as PCA and RPCA. In addition, the complexity of $\ell_1$-GP is near-scalable with the number and size of the matrices.

Advantageously, when compared with other 2D based methods such as 2DPCA and GLRAM, the RLRAMM method achieves a joint diagonal decomposition for multiple matrices, and hence has a higher compression ratio given the same target rank. Furthermore, the $\ell_p$-GP approximation process with 0<p<2 works well even in impulsive noise environments, which is more preferable to alternative methods that are not robust to outlier measurements.

In addition, it is shown in the experiment results that the sum of the $\ell_p$-norms of the residuals decay exponentially. Experimental results also demonstrate the superiority of the GP method over the PCA, RPCA, 2DPCA and GLRAM, in terms of outlier-robustness, computational simplicity, and image reconstruction accuracy.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing digital image data, comprising the steps of:
    transforming the digital image data to a matrix representation including a plurality of matrices;
    decomposing the matrix representation into a series of matrix approximations; and
    processing, with an approximation process, the plurality of matrices thereby obtaining a low-rank approximation of the plurality of matrices; and
    constructing at least one digital image based on the low-rank approximation of the plurality of matrices,
    wherein the approximation process includes a greedy pursuit approximation process;
    wherein the approximation process includes a linear regression process;
    wherein the approximation process includes a $\ell_p$-norm minimization process, wherein p∈(0,2]; and
    wherein p=1 and the approximation process is a $\ell_1$-GP approximation process.

2. The method for processing digital image data in accordance with claim 1, wherein the approximation process includes determining a best rank-one approximation of a plurality of residual matrices in each of a plurality of iteration steps in the approximation process.

3. The method for processing digital image data in accordance with claim 2, wherein the approximation process further includes subtracting a plurality of rank-one basis matrices from the plurality of residual matrices.

4. The method for processing digital image data in accordance with claim 3, wherein the approximation process further includes a $\ell_1$-rank-one fitting process for obtaining the low-rank approximation of the plurality of matrices.

5. The method for processing digital image data in accordance with claim 2, further comprising the step of representing a solution associated with the matrix representation and the IC residual matrices as $(u_i, v_i, s_i)$ and $\{R_k^i\}_{k=1}^K$ respectively, at the ith iteration step.

6. The method for processing digital image data in accordance with claim 5, wherein in the ith iteration step, the best rank-one approximation of $\{R_k^{i-1}\}_{k=1}^{K}$ is determined.

7. The method for processing digital image data in accordance with claim 1, further comprising the step of determining a weighted median in the $\ell_1$-GP approximation process.

8. The method for processing digital image data in accordance with claim 1, wherein the digital image data is digitally compressed data.

9. The method for processing digital image data in accordance with claim 1, further comprising the step of constructing a data representation of the digital image data being processed based on the low-rank approximation of the plurality of matrices.

10. The method for processing digital image data in accordance with claim 9, wherein the step of constructing at least one digital image based on the low-rank approximation of the plurality of matrices includes performing image reconstruction with digital image data including noise and/or defect.

\* \* \* \* \*